United States Patent [19]

Krisher

[11] Patent Number: 4,991,173
[45] Date of Patent: Feb. 5, 1991

[54] APPARATUS AND METHOD FOR MAPPING OF PCM SIGNALING AT SIGNALING RATE CONVERSION BOUNDARIES

[75] Inventor: Dale L. Krisher, Raleigh, N.C.
[73] Assignee: Alcatel NA, Inc.; Hickory, N.C.
[21] Appl. No.: 258,993
[22] Filed: Oct. 17, 1988
[51] Int. Cl.$^5$ ............................................. H04J 3/12
[52] U.S. Cl. .................................. 370/110.1; 370/84
[58] Field of Search .................. 370/84, 110.1, 112, 370/79; 341/55, 61

[56] References Cited

U.S. PATENT DOCUMENTS

| | | | |
|---|---|---|---|
| 4,598,397 | 7/1986 | Nelson et al. | 370/84 |
| 4,617,658 | 10/1986 | Walters | 370/84 |
| 4,641,303 | 2/1987 | Vogl | 370/84 |
| 4,737,954 | 4/1988 | Smedley | 370/110.1 |
| 4,752,765 | 6/1988 | Larson | 341/55 |
| 4,805,171 | 2/1989 | Ewell | 370/110.1 |

Primary Examiner—Douglas W. Olms
Assistant Examiner—Min Jung
Attorney, Agent, or Firm—Peter C. Van Der Sluys

[57] ABSTRACT

In pulse code modulation communications systems where network links, using A, AB and ABCD signaling systems having different sized bit patterns and signaling rates for signaling operations, are interfaced, apparatus is provided to control the mapping of signaling patterns at signaling rate conversion boundaries.

15 Claims, 4 Drawing Sheets

| (1) AB REFERENCE STATE | (2) ABCD REFERENCE STATE | (3) BINARY ADDRESS INPUT ABCD | (4) BINARY DATA OUTPUT ABCD |
|---|---|---|---|
| 1 | 0 | 0000 | 0000 |
| 5 | 1 | * 0001 | 0100 |
| 7 | 2 | * 0010 | 1000 |
| 9 | 3 | * 0011 | 0110 |
| 5 | 4 | 0100 | 0100 |
| 2 | 5 | 0101 | 0101 |
| 9 | 6 | 0110 | 0110 |
| 8 | 7 | * 0111 | 1101 |
| 7 | 8 | 1000 | 1000 |
| 9 | 9 | * 1001 | 0110 |
| 3 | 10 | 1010 | 1010 |
| 6 | 11 | * 1011 | 1110 |
| 9 | 12 | * 1100 | 0110 |
| 8 | 13 | 1101 | 1101 |
| 6 | 14 | 1110 | 1110 |
| 4 | 15 | 1111 | 1111 |

FIG.5

APPARATUS AND METHOD FOR MAPPING OF PCM SIGNALING AT SIGNALING RATE CONVERSION BOUNDARIES

BACKGROUND OF THE INVENTION

The present invention relates to pulse code modulation (PCM) networks such as communications systems, in which operational signals are transmitted along with the voice and/or data signals. The operational signals are binary coded patterns and serve various functions such as start and stop for billing purposes and other administrative functions. This non-voice binary communication is called signaling.

At the present time, the signaling is done by different signaling systems in various types of PCM networks. However, the per channel bandwidth of these signaling systems is fixed at 4 bits every 3 ms. The different signaling systems have signaling rates determined by the number of bits in the binary signaling patterns and the period with which those patterns are repeated One type of binary signaling pattern in general use is the ABCD pattern which transmits the signaling information in four-bit patterns repeating every 3.0 ms and consequently has a signaling rate of 333 Hz. Two bit patterns repeating every 1.5 ms are used by some systems and are known as AB patterns with a rate of 667 Hz. Another type of signaling pattern is the A pattern being a single bit pattern repeating every 0.750 ms and having a rate of 1333 Hz. Networks using these various signaling patterns are commonly referred to as A, AB, or ABCD networks.

It regularly occurs that a network of higher signaling rate connects to a network using a lower signaling rate and vice versa. In some instances the interface between the higher signaling rate network and an ABCD network can result in signal patterns being mapped into the ABCD network which can adversely affect network operation and the transparent transport of signaling information. The present invention is concerned with selective or controlled mapping of one signaling rate network into another signaling rate network at an interface.

In addition to the voice and data signals and the binary coded operational signals, it is usual to have certain designated ABCD network patterns reserved for network specific functions. One of these reserved non-signaling patterns are in one instance referred to as the Unicode pattern.

The invention will be described with respect to a particular type of problem that occurs at a signaling rate conversion boundary or interface when a higher signaling rate network interfaces an ABCD signaling rate network. The problem results from the fact that the higher rate pattern can be repeated more than once during the time needed for an ABCD pattern and depending upon the phase of the mapping ambiguous, redundant patterns can be produced in the ABCD network. In most cases these ambiguous, redundant patterns do not provide a serious problem. However, in certain situations the ambiguous, redundant patterns can result in erroneous network operation as when one of these redundant pattern mappings is the same as a reserved network specific pattern such as Unicode. It is to this general problem that the present invention is directed.

This compatibility problem exists at certain PCM interfaces and jeopardizes the error free transport of signaling information the error-free transport of voice information, the error-free transport of data information and correct telecommunications network operation. Non-signaling, network specific ABCD patterns, such as Unicode which have been defined in ABCD networks may be erroneously introduced into an ABCD network at these signaling rate changing interfaces. This can cause signaling, voice, and data information blockage and incorrect operation of the ABCD network.

For example, the ABCD Unicode pattern 0010 which is used in some networks may be falsely introduced at AB to ABCD signaling rate conversion interfaces. This is particularly so when certain AB signaling states defined in Bellcore Technical Requirement TR-TSY-000008 are mapped into an ABCD network. This can cause untimely trunk conditioning in the ABCD signaling system where Unicode is defined at the downstream termination from where this translation occurs and can prevent the correct AB signaling state from being delivered to its destination.

When higher rate AB signaling is uncontrollably mapped into an ABCD network the full complement of ABCD patterns available in the ABCD network cannot be freely used due to the redundant ABCD patterns that can be produced when AB signaling is mapped into an ABCD network.

SUMMARY OF THE INVENTION

Accordingly, it is a primary object of the present invention to control the passage of binary signaling patterns at rate conversion boundaries where signaling in a network of one signaling rate is passed to a network of a different signaling rate to prevent the insertion of an undesired network-specific binary signal.

A system is provided at the rate conversion boundary that detects ambiguous, redundant binary patterns that could result in erroneous operation if passed through the interface. The system serves to substitute selected signaling patterns for the detected redundant ones.

This invention also provides a method for identifying and reserving a group of ABCD patterns which can be made available for non-signaling network specific functions in ABCD networks by making use of this controlled mapping function.

DESCRIPTION OF THE DRAWINGS

The above and other objects and features of the invention will become apparent with reference to the following description and to the drawings wherein.

DETAILED DESCRIPTION OF THE INVENTION

A signaling rate conversion boundary can exist at any point in a PCM system where links with different signaling rates meet. There are currently three signaling rates in common use and these are shown in Table 1.

TABLE 1

| Network Signaling System | Binary Bits in Signal Pattern | Maximum Possible Unique States | Signaling Rate |
|---|---|---|---|
| A | 1 | 2 | 1333 Hz |
| AB | 2 | 4 | 667 Hz |
| ABCD | 4 | 16 | 333 Hz |

The A and AB signaling systems are typically found but not restricted to links of the types conventionally designated SF, ESF or TR8 framed DS1 links whereas the ABCD system is typically found but not restricted to ESF, Syntran or Sonet links.

The mapping of A bit rate signaling into the ABCD signaling patterns does not currently present any problem of the type herein considered.

Table 2 illustrates the mapping of A signaling into an ABCD signaling link. Normally an A signaling link is employed to carry two state signaling and these two states are shown in Table 2 as reference states 1 and 2. In this format each of the two states may be represented by fixing the value of the A bit at a constant 0 or 1. These reference patterns will appear in the ABCD link as 0000 or 1111 as shown in Table 2. With this mapping there would be fourteen unused ABCD patterns which could be reserved for non-signaling, network specific operations.

TABLE 2

| A States | | | ABCD States | | |
|---|---|---|---|---|---|
| Signaling States | Signaling Datastream Showing How Redundant States Can Result from the Random Mapping at the Rate Change Boundary | Signaling States with Uncontrolled Mapping | Signaling States Selected by Controlled Mapping | | States Available for ABCD System Use |
| Ref. State | A | AAAAAAAAAA | ABCD | Ref. State | ABCD | ABCD |
| 1 | 0 | 0000000000 | 0000 | 0 | 0000 | none |
| 2 | 1 | 1111111111 | 1111 | 15 | 1111 | none |
| | | | | 1 | | 0001 |
| | | | | 2 | | 0010 |
| | | | | 3 | | 0011 |
| | | | | 4 | | 0100 |
| | | | | 5 | | 0101 |
| | | | | 6 | | 0110 |
| | | | | 7 | | 0111 |
| | | | | 8 | | 1000 |
| | | | | 9 | | 1001 |
| | | | | 10 | | 1010 |
| | | | | 11 | | 1011 |
| | | | | 12 | | 1100 |
| | | | | 13 | | 1101 |
| | | | | 14 | | 1110 |

Table 3 illustrates the timing of the A to ABCD signaling conversion.

TABLE 3

A to ABCD Signaling Conversion
A = 0

A Bit Signaling

A = 0                                     0.750 ms
|0|0|0|0|0|0|0|0|0|0|0|0|0|

ABCD Bit Signaling

ABCD                       3.0 ms
Mapping #1
|0 0 0 0|0 0 0 0|0 0 0 0|0

TABLE 3-continued

A to ABCD Signaling Conversion
A = 0

ABCD Mapping #2    0 |0 0 0 0 |0 0 0 0 |0 0 0 0

ABCD Mapping #3    0 0 |0 0 0 0 |0 0 0 0 |0 0 0

ABCD Mapping #4    0 0 0 |0 0 0 0 |0 0 0 0 |0 0

Time ——→

The table illustrates the conversion when the A bit equals 0. The signaling rate for A signaling is 0.750 ms, while the signaling rate for ABCD signaling is 3 ms. Thus, there are 3.0 divided by 0.750, or four possible phases with which the two signaling streams can be aligned, as illustrated by mappings 1 through 4 in Table 3. For A to ABCD conversions where A = 0, the signaling conversions for all four possible phases are the same, i.e., ABCD = 0000. The same is true for A = 1 where ABCD = 1111; therefore, no conversion mapping is required to prevent redundant ABCD states.

Table 4 illustrates the A to ABCD signaling conversions for A = 0.

TABLE 4

Signaling Conversion Table for A = 0

| ABCD Mapping | ABCD Output | | | |
|---|---|---|---|---|
| | A | B | C | D |
| 1 | 0 | 0 | 0 | 0 |
| 2 | 0 | 0 | 0 | 0 |
| 3 | 0 | 0 | 0 | 0 |
| 4 | 0 | 0 | 0 | 0 |

There is no resulting ambiguous, redundant signaling as long as no A bit signaling state is defined which changes the binary value of the A bit at a rate greater than that for ABCD signaling, as is presently the case.

Table 5 illustrates the mapping of AB signaling into an ABCD signaling link. Normally an AB signaling link is employed to carry four state signaling and these four states are shown in Table 5 as AB reference states 1–4. In this format each of the four states may be represented by fixing the value of A and B bits into a constant 0 or 1 value. These reference patterns will appear in the ABCD link as 0000, 0101, 1010 and 1111 as shown in Table 5. With this mapping there would be twelve unused ABCD patterns which could be reserved for non-signaling, network specific operations and no ambiguous, redundant ABCD signaling states.

However, for several AB signaling rate TR8 applications the required number of signaling states exceeds four. This is accomplished by toggling one or both of the A and B bits in an alternating 0/1 pattern resulting in five additional AB states designated 5–9 in Table 5 For example, in reference state 5, the A bit is represented by 0 and the B bit is toggled 0/1 so that the B bit alternates as 1010. The combined A and B bits produce a pattern sequence 0100010001 as shown in the Table.

Table 6 illustrates the timing for AB and ABCD signaling conversion for the case of AB reference state 5, A=0 and B=0/1.

TABLE 6
AB to ABCD Signaling Conversion
A or B Bit Toggling

AB Bit Signaling
AB = 0, 0/1                                                    1.5 ms

|0 0|0 1|0 0|0 1|0 0|0 1|
|A B|A B|A B|A B|A B|A B|

ABCD Bit Signaling
ABCD Mapping #1                                                3.0 ms

|0 0 0 1|0 0 0 1|0 0 0 1|
|A B C D|A B C D|A B C D|

ABCD Mapping #2

|0 0|0 1 0 0|0 1 0 0|0 1|
|C D|A B C D|A B C D|A B|

TABLE 5

| | AB States | | | ABCD States | | |
|---|---|---|---|---|---|---|
| | | | Signaling Datastream Showing How Redundant States Can Result from the Random Mapping at the Rate Change Boundary | Signaling States with Uncontrolled Mapping | Signaling States Selected by Controlled Mapping | Redundant States Available for ABCD System Use |
| Ref. States | Signaling States A | B | ABABABABAB | ABCD | Ref. State | ABCD | ABCD |
| 1 | 0 | 0 | 0000000000 | 0000 | 0 | 0000 | None |
| 2 | 0 | 1 | 0101010101 | 0101 | 5 | 0101 | None |
| 3 | 1 | 0 | 1010101010 | 1010 | 10 | 1010 | None |
| 4 | 1 | 1 | 1111111111 | 1111 | 15 | 1111 | None |
| 5 | 0 | 0/1 | 0100010001 | | | | |
| | mapping 1 | | ├──┤ | 0001 | 1 | 0001 | 0100 |
| | mapping 2 | | ├──┤ | 0100 | 4 | 0100 | 0001 |
| 6 | 1 | 0/1 | 1110111011 | | | | |
| | mapping 1 | | ├──┤ | 1011 | 11 | 1011 | 1110 |
| | mapping 2 | | ├──┤ | 1110 | 14 | 1110 | 1011 |
| 7 | 0/1 | 0 | 1000100010 | | | | |
| | mapping 1 | | ├──┤ | 0010 | 2 | 0010 | 1000 |
| | mapping 2 | | ├──┤ | 1000 | 8 | 1000 | 0010 |
| 8 | 0/1 | 1 | 1101110111 | | | | |
| | mapping 1 | | ├──┤ | 0111 | 7 | 0111 | 1101 |
| | mapping 2 | | ├──┤ | 1101 | 13 | 1101 | 0111 |
| 9 | 0/1 | 0/1 | 1001100110 | 0110 | 6 | 0110 | 1001 |
| | mapping 1 | | ├──┤ | | | | 0011 |
| | | | | | | | 1100 |
| | mapping 2 | | ├──┤ | 1001 | 9 | 1001 | 0110 |
| | | | | | | | 0011 |
| | | | | | | | 1100 |
| | mapping 3 | | 1100110011 ├──┤ | 0011 | 3 | 0011 | 0110 |
| | | | | | | | 1001 |
| | | | | | | | 1100 |
| | mapping 4 | | ├──┤ | 1100 | 12 | 1100 | 0110 |
| | | | | | | | 1001 |
| | | | | | | | 0011 |

This state may be mapped in an uncontrolled system as shown by the mapping 1 and mapping 2 designations, resulting arbitrarily in either ABCD states, 0001 and 0100 which are reference states 1 and 4 in the ABCD link. Similarly, AB reference states 6, 7, and 8 may each also be mapped into either of two patterns in passing to the ABCD link. Reference state 9 in which both A and B bits are toggled, may be mapped into any of four patterns in the ABCD link.

Time⟶

Since the signaling rate for AB bit signaling is 1.5 ms and the ABCD signaling rate is 3.0 ms there are 3 divided by 1.5, or two possible phases with which the two signaling streams can align. These phases are illustrated by mappings 1 and 2 shown in Table 6. For AB to ABCD signaling conversions where either the A or B bit of the AB bit stream is toggling there are two redundant ABCD signaling states possible. Thus, controlled conversion mapping is required to prevent the production of redundant ABCD states.

Table 7 illustrates the AB to ABCD signaling conversion table for bit A=0 and bit B toggling.

TABLE 7

| AB to ABCD Signaling Conversion Table for AB = 0, 0/1 | | | | |
|---|---|---|---|---|
| ABCD Mapping | A | B | C | D |
| 1 | 0 | 0 | 0 | 1 |
| 2 | 0 | 1 | 0 | 0 |

Table 8 illustrates AB to ABCD signaling conversion where both A and B bits are toggling.

TABLE 8

AB to ABCD Signaling Conversion
A and B Bits Toggling

AB Bit Signaling
AB = 0/1, 1/0
Phase #1                                            1.5 ms
|0 1|1 0|0 1|1 0|0 1|1 0|
|A B|A B|A B|A B|A B|A B|

ABCD Bit Signaling
ABCD                                                3 ms
Mapping #1
ABCD = 0110
|0 1 1 0|0 1 1 0|0 1 1 0|
|A B C D|A B C D|A B C D|

ABCD
Mapping #2
ABCD = 1001
|0 1|1 0 0 1|1 0 0 1|1 0|
|C D|A B C D|A B C D|A B|

Time ——>

AB Bit Signaling
AB = 0/1, 0/1
Phase #2                                            1.5 ms
|0 0|1 1|0 0|1 1|0 0|1 1|
|A B|A B|A B|A B|A B|A B|

ABCD Bit Signaling
ABCD                                                3 ms
Mapping #3
ABCD = 0011
|0 0 1 1|0 0 1 1|0 0 1 1|
|A B C D|A B C D|A B C D|

ABCD
Mapping #4
|0 0|1 1 0 0|1 1 0 0|1 1|
|C D|A B C D|A B C D|A B|

Time ——>

Since the signaling rate for AB signaling is 1.5 ms and for ABCD signaling is 3.0 ms there are two possible phases with which the signaling streams can align. In addition, because the AB signaling can be generated with one of two phases AB=0/1, 1/0 and AB=0/1 and 0/1, there are two sets of mappings for this AB signaling state. Thus, for AB to ABCD signaling conversions where both the A and B bits of the AB bit stream are toggling, there are four redundant ABCD signaling states possible: ABCD=0110, 1001, 0011 and 1100. Therefore, controlled conversion mapping is required to prevent redundant ABCD states.

Table 9 illustrates AB to ABCD signaling conversion for both the A and B bit toggling.

TABLE 9

| AB to ABCD Signaling Conversion Table for AB = 0, 0/1 | | | | | |
|---|---|---|---|---|---|
| AB | ABCD | OUTPUT | | | |
| Phase | Mapping | A | B | C | D |
| 1 | 1 | 0 | 1 | 1 | 0 |
| 1 | 2 | 1 | 0 | 0 | 1 |
| 2 | 3 | 0 | 0 | 1 | 1 |
| 2 | 4 | 1 | 1 | 0 | 0 |

Table 5 shows how all nine defined AB signaling states are mapped into all of the sixteen ABCD reference states. The four signaling states having a fixed 1 or 0 for each A or B signaling bit map into non-redundant ABCD signaling states (AB reference states 1–4 respectively corresponding to ABCD reference states 0, 5, 10, 15). The four states which allow the 0/1 pattern in either the A or B signaling bit each map into two possible ambiguous, redundant ABCD signaling states (AB reference states 5–8 respectively corresponding to ABCD reference states 1 or 4, 11 or 14, 2 or 8, and 7 or 13). The state which allows the toggling pattern in both A and B signaling bits simultaneously maps into one of four possible ambiguous, redundant ABCD signaling states (AB reference state 9 into ABCD reference states 6, 9, 3 or 12).

Thus, it is seen that with normal uncontrolled mapping, all 16 ABCD reference states may be transposed from an AB network leaving no patterns available to be reserved for network specific operations.

Figure 1:
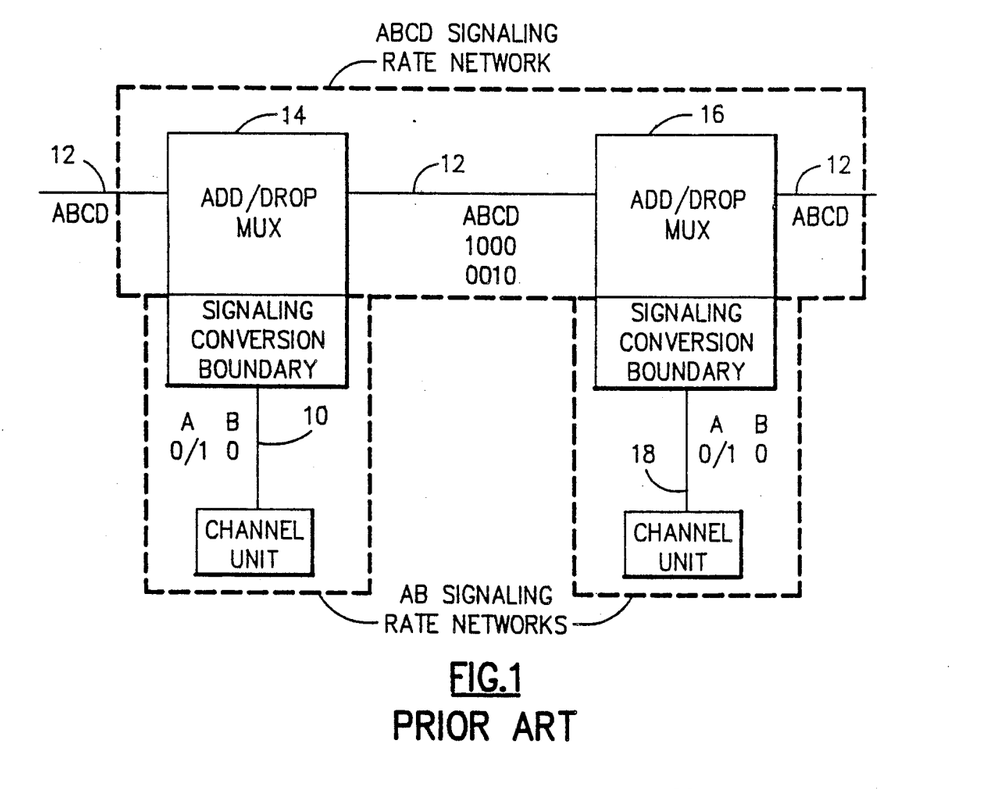
FIG. 1 illustrates a system having an AB signaling rate link connected to an ABCD signaling rate link with uncontrolled mapping at the interfaces.

FIG. 1 illustrates a transmission system having an AB link with signaling patterns mapped through to an ABCD link wherein the ABCD signaling patterns mapped from the AB signal patterns are ambiguous and redundant. A TR8 formatted, AB signaling rate link 10 is added into a Sonet formatted, ABCD signaling rate link 12 at interface 14 and then is dropped at interface 16 at another TR8 formatted, AB signaling rate link 18. The state of the signaling bits for each section are shown adjacent to the links on the figure. The links are shown connected to Coin Channel Units and the signaling bits shown are for a Positive Coin Control signaling state (Table 5, AB reference state 7) of the TR8 Coin Channel Unit Note that this AB signaling state may be mapped into the Sonet network as either of the two ambiguous, redundant ABCD patterns defined for that AB state, i.e., 1000 or 0010. Since both the added and the dropped TR8 links have the same AB signaling state regardless of which redundant ABCD signaling pattern is used in the Sonet link this would seem to indicate that The ABCD Sonet link was transparent to the AB signaling of the TR8 link. This may be true in some cases but will not be true for others.

The Positive Coin Control signaling state of the TR8 Coin Channel Unit is translated at the AB to ABCD signaling rate boundary 14 where the TR8 and Sonet formatted links meet into one of two redundant ABCD signaling patterns, and either of these can translate back to the same signaling state at the ABCD to AB signaling rate boundary 16. Currently the selection of which ABCD pattern is used is not controlled by the interface, and therefore there is a random chance of either ABCD pattern being inserted. If the interface maps the AB signaling pattern into the 1000 ABCD signaling pattern to be transported through the Sonet network there should not be any problem. However, if the interface maps the AB signaling pattern into the 0010 ABCD signaling pattern there can be a problem.

The problem is that for these AB signaling rate patterns which produce redundant ABCD signaling patterns, at least one pattern has been defined as a non-signaling network specific reserved pattern. One such ABCD signaling network specific pattern to exhibit this problem is the 0010 ABCD pattern for Unicode.

As shown in FIG. 1, the AB/TR8 signaling AB reference state 7 may be carried by one of two redundant ABCD patterns one of which is the 0010 pattern for Unicode. For current network operation for which UNICODE is defined this conversion must be prohibited. To accomplish this the present invention recognizes the AB signaling state 7 and insures that the non-unicode 1000 redundant pattern is passed into the ABCD network. Since either of the two redundant ABCD signaling patterns for this reference state will produce the correct transport of signaling through the ABCD signaling network the substitution is transparent as far as the overall network is concerned.

The AB signaling states which produce redundant ABCD mappings are shown in Table 5 as AB reference states 5-9. This table shows the selection of patterns which must be reserved to guarantee the correct transport of signaling information and the seven redundant ABCD patterns which can be reserved for non-signaling, ABCD network specific operations. For example, an additional ABCD network specific pattern can be generated by defining the AB reference state 6 signaling pattern to be 1110. This is implemented by controlling the mapping at the rate conversion boundary so that both the 1011 and 1110 patterns for this signaling state are mapped into the 1110 pattern in the ABCD network. This allows the redundant pattern 1011 for AB reference state 6 to be given another definition within the boundaries of the ABCD network and used for non-signaling purposes. The alternate mapping of this state could also be implemented with the 1011 pattern representing AB signaling state reference number 6 and the 1110 pattern being reserved for a network specific definition. Any mapping into the ABCD signaling states of an AB signaling state for any of the AB reference states may be chosen for a system. As for example mapping 1 may be chosen for AB reference state 5 while mapping 2 may be selected for AB reference state 6. Any one of mappings 1, 2, 3 or 4 can be chosen for AB reference state 9. Thus, the invention allows for the selection of the most advantageous mapping for the particular system.

Figure 2:
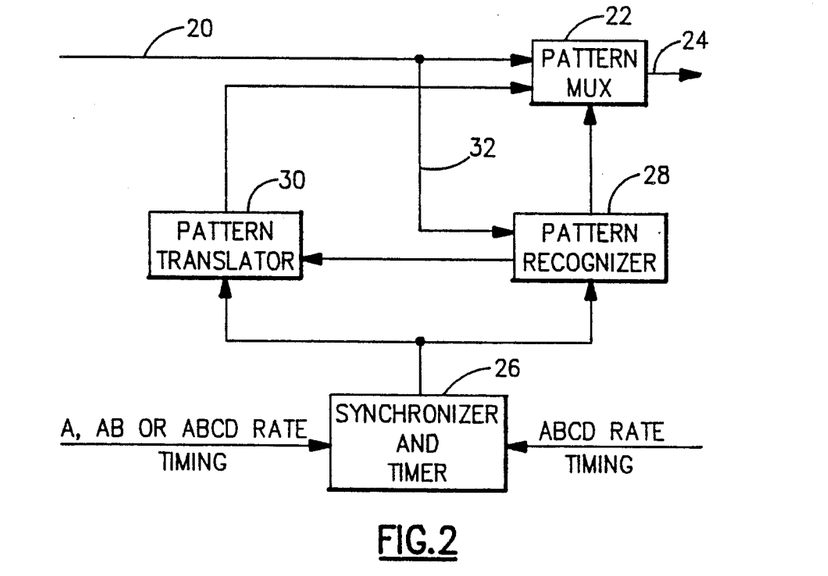
FIG. 2 is a block diagram illustrating the controlled mapping apparatus of the present invention.

FIG. 2 is a block diagram of a circuit to implement the controlled mapping on the invention. There are numerous implementations that may be used; however, the circuit of FIG. 2 best facilitates the explanation of the invention. The circuit of FIG. 2 would normally be implemented as part of an interface such as the ADD/-DROP MULTIPLEXERS 14 and 16 of FIG. 1. Such interfaces receive a serial bit stream from the PCM link and separate out the signaling bits from the voice or data bits. The signaling bits are then converted from serial to parallel format. The signaling bits are provided in parallel form on line 20 and represent either an A, AB or ABCD pattern depending upon the network from which they come. Line 20 is connected to a multiplexer 22 which leads to an ABCD formatted output 24. Synchronization and timing circuit 26 relates the outgoing ABCD signaling rate to the incoming A, AB, or ABCD signaling rate and provides the timing necessary to permit the interface to identify the ABCD signaling patterns into which the incoming signaling bits would be mapped. This synchronization and timing circuit connects to and controls the timing for both a pattern recognition circuit 28 and a pattern translator 30.

Figure 3:
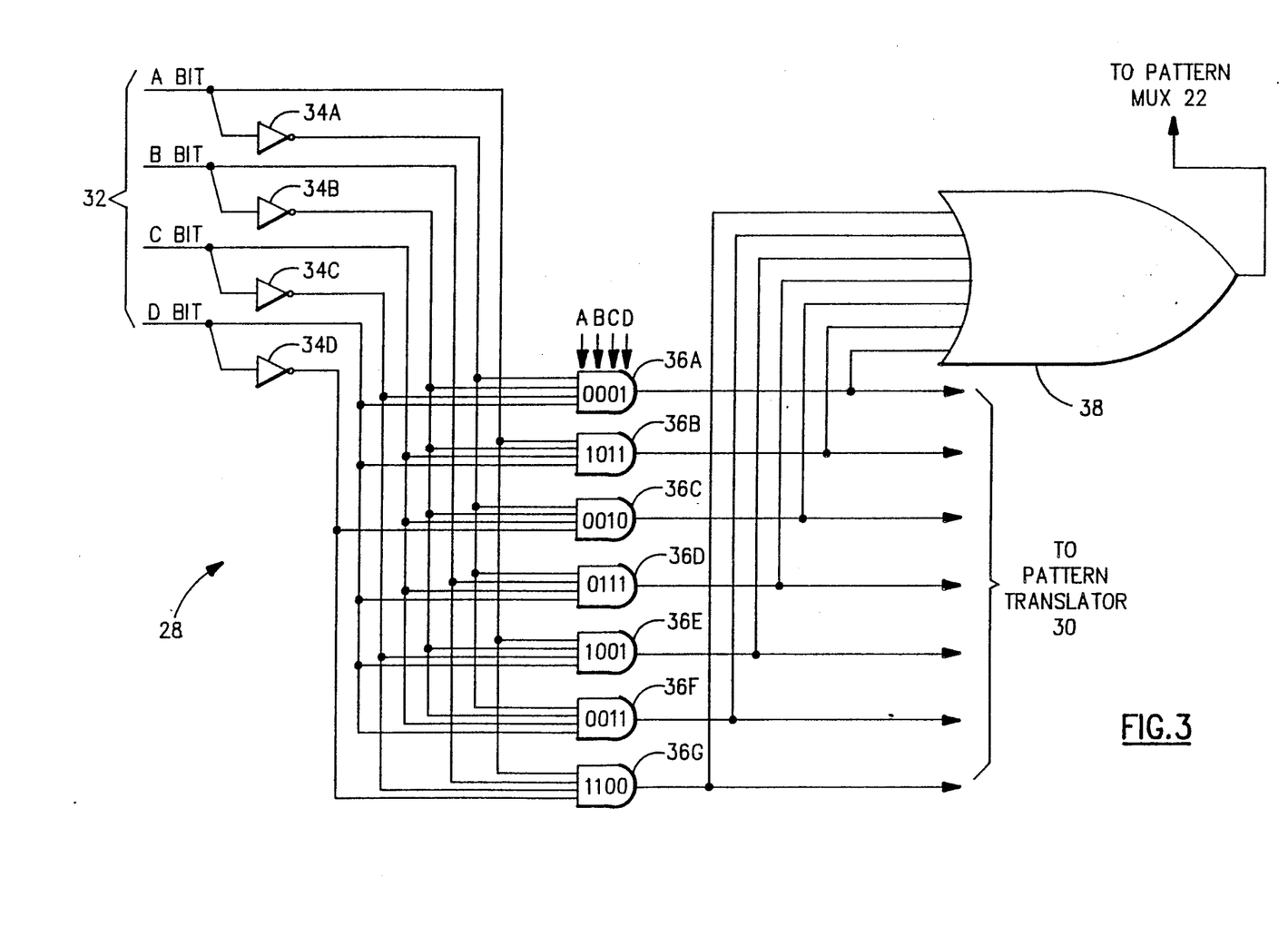
FIG. 3 is a schematic diagram of the pattern recognizer circuit of FIG. 2.

The pattern recognition circuit is designed to recognize any unwanted redundant pattern, as for example the seven redundant states selected from the states listed in Table 5 for ABCD system use. These are the redundant patterns reserved for network specific non-signaling functions. This recognition circuit may be of any convenient design as for example a gating network, as shown in FIG. 3, to detect the redundant patterns appearing on line 20 to which circuit 28 is connected by a connection 32. Circuit 28 also controls pattern multiplexer 22 which it activates upon detection on line 20 of any redundant pattern. Upon such detection, circuit 28 provides an output corresponding to the detected redundant pattern, to the pattern translator 30.

The pattern translator 30 is responsive to a signal from pattern recognizer 28 to output one of the five non-redundant signaling patterns identified in Table 5 that corresponds to the redundant pattern recognized by pattern recognizer circuit 28. Circuit 30 may comprise a combinational logic circuit as shown for example in FIG. 4 which responds to the signal from circuit 28 to cause the appropriate pattern to be outputted to the multiplexer 22 which in response to an output from circuit 28 connects the outputted pattern to output 24 and blocks the redundant pattern from line 20.

The operation of the network of FIG. 2 is summarized by reference to Table 10.

TABLE 10

| (1) AB Ref. State | (2) Possible AB Mapped Patterns | (3) Selected Redundant Patterns Recognized By Circuit 28 | (4) Non-Redundant Patterns Substituted By Unit 30 |
|---|---|---|---|
| 5 | 0001 0100 | 0001 | 0100 |
| 6 | 1011 1110 | 1011 | 1110 |
| 7 | 0010 1000 | 0010 | 1000 |
| 8 | 0111 1101 | 0111 | 1101 |
| 9 | 0110 1001 0011 1100 | 1001 0011 1100 | 0110 |

Column (1) lists the five AB reference states that can produce redundant ABCD signal patterns listed in column (2) because of toggling A or B bits as discussed above.

The seven selected redundant patterns of column (3) are stored in pattern recognition circuit 28. When any one of these is detected on line 20, circuit 28 will activate the multiplexer 22 and signal the pattern translator 30. Activation of the multiplexer will block the detected pattern from being passed through to ABCD output 24. The signal to pattern translator 30 will serve to select the pattern of column (4) corresponding to the detected redundant pattern. This selected signal will be passed to multiplexer 22 and to ABCD network 24.

Referring now to FIG. 3 there is shown connection 32 connected to inverters 34 and to AND gates 36. This pattern recognition network 28 will recognize and respond to the selected redundant patterns discussed above and listed in Table 10, column (3). Thus when redundant pattern 0001 of reference state 5 is recognized, logic 1 appears at the output of gate 36A. Similarly, gates 36B through 36G will output a logic 1 in response to patterns 1011, 0010, 0111, 1001, 0011 and 1100 respectively.

These outputs are passed to the pattern translator 30 and through OR gate 38 to the pattern multiplexer 22. It is understood that a logic 1 in any of the seven AND gate outputs will activate multiplexer 22.

Figure 4:
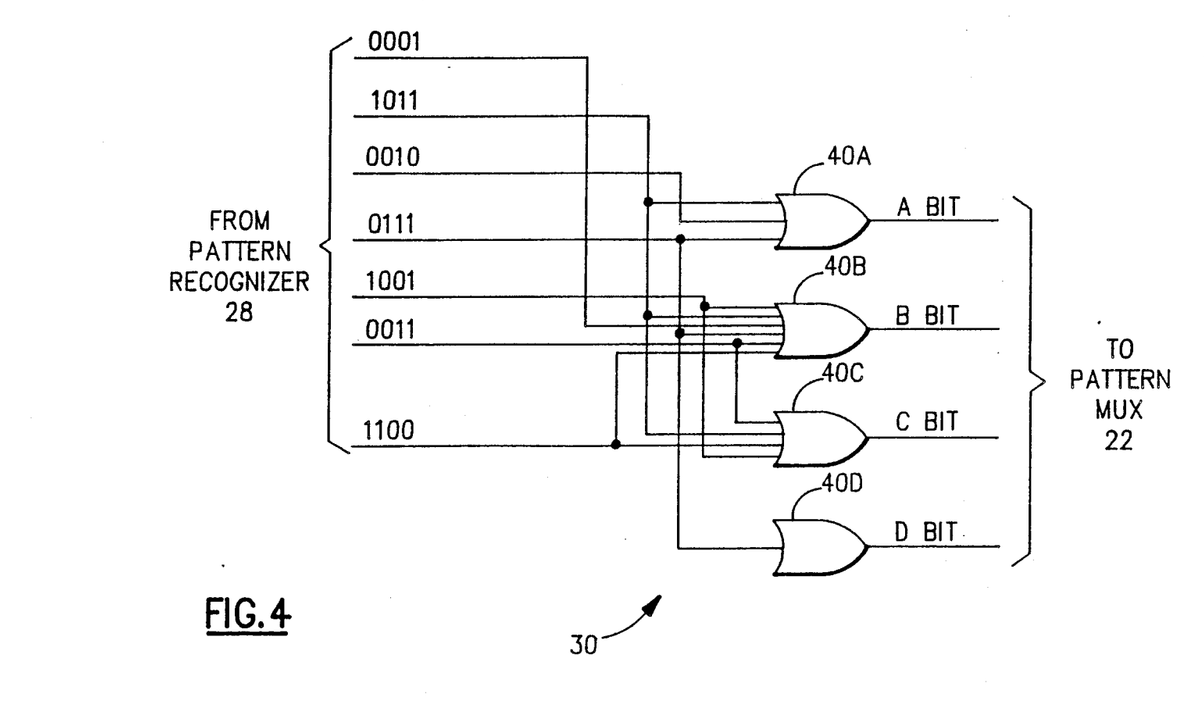
FIG. 4 is a schematic diagram of the pattern translator circuit of FIG. 2.

Now referring to FIG. 4, the outputs from the pattern recognition gating network 28 are connected to OR gates 40A through 40D. These provide the substituted patterns of Table 10, Column (4) in response to the respective patterns of Column (3).

Thus a logic 1 from AND gate 36A in response to redundant pattern 0001 will provide a logic 1 at the output of OR gate 40B to produce the corresponding substituted pattern 0100. The latter will be applied by multiplexer 22 to ABCD network output 24.

Figure 5:
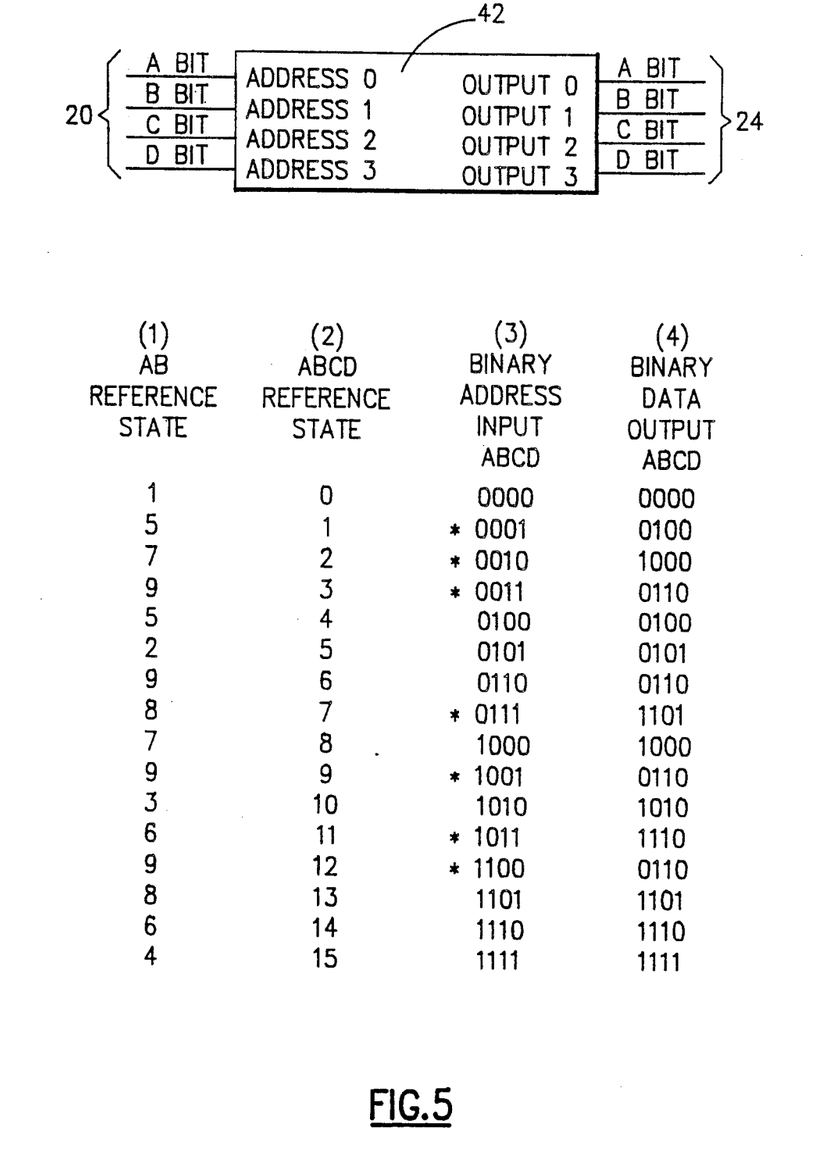
FIG. 5 is another embodiment of the controlled mapping apparatus of the present invention.

FIG. 5 is another and more preferred embodiment of the controlled mapping apparatus of the present invention. In this embodiment there is provided a 16×4 memory element or ROM chip 42 which is connected to line 20. The output is connected to ABCD output 24. When any of the redundant patterns of Table 10 Column (3) is inputted to memory element 42, the corresponding pattern of Column (4) is substituted and passed to ABCD output 24.

This substitution of redundant patterns is also shown in the table of FIG. 5. The input patterns designated with an asterisk (*) in Column (3) are replaced by the corresponding output patterns in Column (4).

In addition to the embodiments described above, the reverse situation can also occur. If a correctly generated Unicode ABCD signaling pattern is outputted through a rate changing interface to an AB signaling rate formatted transmission link, a Unicode pattern can emulate a valid signaling state for certain TR8 services. Therefore it is necessary that all of the non-signaling, ABCD network specific patterns such as Unicode be terminated in the ABCD section of the signaling rat changing interface and the correct A, AB or ABCD signaling pattern mapped into the signaling bits of the interfacing transmission link. The same is true for the other potential ABCD network defined non-signaling patterns.

For the general case, the mapping of signaling herein described can occur in any PCM equipment where a signaling rate change occurs between any of the A bit, AB bit or ABCD bit signaling rates. This would include, but not be limited to, all of the commonly used North American digital PCM services such as T1, T148, T148C, T1C, T2, and T3 and proposed PCM services such as Syntran and Sonet.

Although the invention has been disclosed with respect to two specific embodiments thereof, it is understood that various modifications may be made within the spirit and scope of the appended claims.

What is claimed is:

1. In a communications system, wherein binary coded signaling is transmitted over two or more transmission links, at least two of said transmission links having different signaling rates from each other, apparatus for providing controlled mapping of signaling across signaling rate conversion boundaries between links, comprising:

means for receiving a predetermined binary coded signaling pattern at a first signaling rate from a first transmission link;

means for providing in response to the received predetermined signaling pattern a predetermined, non-redundant binary coded signaling pattern at a second signaling rate; and means for outputting to a second transmission link said predetermined non-redundant binary coded signaling pattern, said predetermined non-redundant binary coded signaling pattern having a corresponding relation to said received predetermined binary coded signaling pattern, so that for the received predetermined binary coded signaling pattern only one predetermined binary coded signaling pattern at said second rate is provided.

2. An apparatus as described in claim 1, wherein a plurality of predetermined binary coded signaling patterns at the first rate are received and a corresponding plurality of predetermined non-redundant binary coded signaling patterns at the second rate are provided.

3. An apparatus as described in claim 2, wherein said binary coded signaling patterns at the first rate are in an AB signaling format and the non-redundant binary coded signaling patterns at the second rate are in an ABCD signaling format.

4. In a communications system, wherein binary coded signaling is transmitted over two or more transmission links, at least two of said transmission links having different signaling rates from each other and different signaling pattern lengths, apparatus for reserving a signaling pattern for a non-signaling function in a first transmission link having a first signaling rate and a first signaling pattern length, comprising:

means for receiving a predetermined binary coded signaling pattern from a second transmission link at a second signaling rate faster than said first signaling rate, said predetermined signaling pattern having a length shorter than said first signaling pattern length;

means for providing in response to the received predetermined binary coded signaling pattern a predetermined, non-redundant binary coded signaling pattern at said first signaling rate and having said first signaling pattern length, said predetermined non-redundant binary coded signaling pattern having a corresponding relation to said received predetermined binary coded signaling pattern and representing a first mapping of said received predetermined binary coded signaling pattern into a first signaling rate pattern, so that a first signaling rate pattern representing a second mapping of said received predetermined binary coded signaling pattern into a first signaling rate pattern may be reserved for a non-signaling function; and means for outputting to the first transmission link said predetermined non-redundant binary coded signaling pattern.

5. An apparatus as described in claim 4, wherein a plurality of predetermined binary coded signaling patterns at the second rate are received and a corresponding plurality of predetermined non-redundant binary coded signaling patterns at the first rate are provided, whereby a group of signaling patterns are reserved.

6. An apparatus as described in claim 5, wherein said binary coded signaling patterns having the first signaling rate are ABCD formatted signals and the binary coded signaling patterns having the second signaling rate are AB formatted signals.

7. A pulse code modulation communications system, comprising:
- a first network in which first binary coded signals of a first rate are employed for signaling and wherein a predetermined group of signal patterns is reserved for non-signaling functions;
- a second network having second binary coded signals of a higher rate than said first rate;
- interface means for connecting said second network to said first network and for mapping said second binary coded signals into first binary coded signals for transmission over said first network; and
- means for preventing said second binary coded signals from being mapped into signals having the reserved signal patterns, said means comprising, means for receiving said first binary coded signals and for providing in response thereto predetermined binary coded signals at the first rate, said predetermined binary coded signals having a corresponding relation to the received first binary coded signals and not including any of the reserved signal patterns.

8. A pulse code modulation communications system, as described in claim 7, wherein said means for preventing said second binary coded signals from being mapped into signals having the reserved signal patterns, comprises:
- means for receiving said first binary coded signals;
- recognition means, connected to said means for connecting, for receiving said mapped signals, for sensing the presence of reserved signal patterns, for providing a detection signal and signals corresponding to the detected reserved signal patterns;
- signal translating means for receiving the signals corresponding to the detected reserved signal patterns, and for providing binary signals in response thereto, said binary signals being in a corresponding group of binary signals having corresponding relations to the reserved group of signal patterns; and
- means connected to said recognition means and said signal translating means and being responsive to the detection signal for applying the binary signals of the corresponding group of binary signals to the first network in place of the related reserved signal patterns.

9. In a communications system, wherein binary coded signaling at a first rate is transmitted over a first transmission link and binary coded signaling at a higher second rate is transmitted over a second transmission link, and wherein said first and second links interface and the binary coded signaling crosses the interface, a method of preventing the binary coded signaling of the higher second rate from being mapped into a predetermined group of binary signaling patterns of the first rate at said interface, said method comprising the steps of:
- detecting the presence and identity of a binary coded signaling pattern that is being mapped into a pattern of the predetermined group;
- translating said detected binary coded signaling pattern into a binary coded signaling pattern of the first rate having a corresponding relation to the detected signaling pattern of said predetermined group; and
- applying the corresponding binary coded signaling pattern to the first transmission link in response to the detection of a binary coded signaling pattern of the predetermined group.

10. The method as defined in claim 9, including the step of permitting the passage through the interface of the binary coded signaling patterns not included in the said predetermined group.

11. In a communications system, wherein binary coded signaling is transmitted over two or more transmission links, at least two of said transmission links having different signaling rates from each other, apparatus for controlled mapping of signaling across signaling rate conversion boundaries between links, comprising:
- recognition means for detecting each of a first predetermined group of binary signals and for producing a detection signal and a second signal corresponding to the detected signal of said first predetermined group;
- signal translating means for receiving the second signal and for providing a binary signal having a corresponding relation to the detected signal of said first predetermined group; and
- signal receiving means connected to said recognition means and to the signal translating means to receive said detection signal and said signal provided by said signal translating means for blocking said detected signal and passing the signal provided by said signal translating means in response to said detection signal.

12. The apparatus set forth in claim 11, wherein said signal receiving means is a multiplexer circuit operable to pass the signal provided by said signal translating means in response to the detection signal.

13. The apparatus as set forth in claim 11, including timing means connected to the recognition means and signal translating means.

14. In a communications system, wherein binary coded signaling patterns are transmitted over two or more transmission links, at least two of said transmission links having different signaling rates from each other, apparatus for controlled mapping of signaling patterns across signaling rate conversion boundaries between links, comprising:
- recognition means for detecting each of a first predetermined group of binary coded signaling patterns and for producing a detection signal indicating the detection of any one of said first predetermined group of binary coded signaling patterns and a second binary coded signaling pattern corresponding to the detected signaling pattern of said first predetermined group; and
- signal receiving means, connected to said recognition means to receive said detection signal and said second binary coded signaling pattern corresponding to the detected signaling pattern, for blocking said detected signaling pattern and passing said second binary coded signaling pattern in response to said detection signal.

15. The apparatus set forth in claim 14, wherein said signal receiving means is a multiplexer circuit operable to pass the second binary coded signaling pattern in response to the detection signal.

* * * * *